United States Patent [19]

Nativi

[11] 4,380,613

[45] Apr. 19, 1983

[54] GASKETING AND SEALING COMPOSITION

[75] Inventor: Larry A. Nativi, Rocky Hill, Conn.

[73] Assignee: Loctite Corporation, Newington, Conn.

[21] Appl. No.: 279,905

[22] Filed: Jul. 2, 1981

[51] Int. Cl.³ ............................................. C08L 75/06
[52] U.S. Cl. .................................... 525/440; 525/920
[58] Field of Search ................................. 525/440, 920

[56] References Cited

U.S. PATENT DOCUMENTS

| 3,425,988 | 2/1969 | Gorman | 525/920 |
| 3,509,234 | 4/1970 | Burlant | 525/440 |
| 3,677,920 | 7/1972 | Kai | 525/920 |
| 3,876,726 | 4/1975 | Ford | 525/920 |
| 3,975,457 | 8/1976 | Chang | 525/920 |
| 4,268,646 | 5/1981 | Agger | 525/920 |
| 4,296,215 | 10/1981 | Markiewitz | 525/440 |
| 4,297,185 | 10/1981 | Chevreux | 525/920 |

FOREIGN PATENT DOCUMENTS 1430422  3/1976  United Kingdom .
1448257  9/1976  United Kingdom .

*Primary Examiner*—Paul Lieberman
*Attorney, Agent, or Firm*—Eugene F. Miller

[57] ABSTRACT

An adhesive composition particularly useful as a gasketing or sealing material comprising a polymerizable methacrylate polyester-urethane compound and a free-radical catalyst system. The adhesive composition is to be cured under conditions suitable for free-radical generation.

9 Claims, No Drawings

GASKETING AND SEALING COMPOSITION

BACKGROUND OF THE INVENTION

The assembly and sealing of metal and other parts with chemical adhesives and sealants have become important product and maintenance tools in modern industry. One area of present interest is the joining and sealing of mating surfaces, by means of a chemical gasket.

A gasket is a sealing member of relatively soft material intended to be placed between a pair of mating surfaces, usually flanges, of components of relatively harder material to assist coupling the components by making the joint between them leakproof. The joint is effected by pressing the surfaces together with sufficient force to confirm the gasket to the surfaces. Most gaskets are cutouts from laminar material such as paper, cork, rubber or other various fiber compositions, and are non-adhesive in operation.

The chemical gaskets of the prior art suffer from several limitations which prevent their use in a number of important applications. Typically, these gaskets could not withstand temperatures of greater than 250° F. for any length of time without degradation of properties. The instant composition has improved heat resistance due to the incorporation of a polyester-urethane-methacrylate compound, which heretofore has not been known to have been used in compositions such as the one disclosed herein.

For further detail of the prior art compositions, see co-pending application, Ser. No. 05/580,267, filed May 23, 1975, and U.S. Pat. No. 3,425,988.

SUMMARY OF THE INVENTION

The adhesive compositions of the instant invention are especially designed for use as gasketing or sealing materials, although other uses are contemplated. These compositions exhibit improved temperature resistance, resistance to hydrocarbon fluids, hydrolytic stability, and retain excellent mechanical properties while remaining flexible at temperatures up to 350° F. for significant periods of time. Additionally, these compositions have good surface wetting ability, particularly on oily or waxy surfaces.

More particularly, this invention relates to adhesive compositions comprising (i) at least one polymerizable polyester-urethane-acrylate compound and (ii) a free-radical catalyst system. A particular advantage of the instant composition is their excellent resistance to high temperature exposure. The prior art compositions which are useful as gasketing materials suffer from a limited capability to resist temperatures beyond 250° F. for any substantial period of time. The gasketing applications typically encountered involve mechanical and thermal vibration and stress, which when combined with high temperatures resulted in gasket failure. The instant novel compositions solve this problem by incorporating a combination of material which yields flexibility and strength during extended periods of heat and vibration. This improvement is significant on many engine applications.

Another object of this invention is to provide a composition which has excellent wetting ability, particularly on untreated, oily or waxy surfaces, and demonstrates excellent solvent resistance; e.g., to hydrocarbons.

A further object of the invention is to provide a composition which is capable of curing by any suitable means which generates free-radical polymerization. Ultra-violet radiation and heat are among the known methods of doing this. Additionally, the composition is capable of curing under anaerobic conditions providing the free-radical catalyst system is properly chosen.

DETAILED DESCRIPTION OF THE INVENTION AND ITS PREFERRED EMBODIMENTS

The polyester-urethane-acrylate compounds of the instant composition are formed by reacting a polyester diol with toluene diisocyanate, and further reacting that product with a polymerizable acrylic or methacrylate acid ester. The preferred polyester diol is manufactured by the Inolex Company under the trade name Lexorez 1400-120. This polyester diol is formed by reaction of neopentyl glycol with 1,6-hexanediol adipate. Other polyester diols useful are formed by the reaction of neopentyl glycol with a diol adipate of more than 3 carbon e.g., 1,4-butanediol adipate.

The reaction ratio of the equivalent weights of the polyster diol to the toluene diisocyanate (TDI) should generally be in the range of about 1.0 of polyester diol to about 1.7 to about 2.2 of toluene diisocyanate. The preferred reaction ratio is 1.0 equivalents of the polyester diol for every 1.9 equivalents of TDI. This preferred reaction ratio is particularly important to the properties of the final composition. The 1:1.9 ratio yields a composition with a chemical structure having a high degree of flexibility and stability. The copolymer formed is generally of a random copolymer structure. This copolymer product is then reacted with an acrylate or methacrylate ester monomer, producing acrylate and end-capping. The useful range of equivalents of the ester monomers is about 0.9 to about 3.0, the preferred being in the range of 1.6 to 2.0, and the most preferred being 1.8 equivalents.

The polymerizable acrylate and methacrylate ester monomers used to cap the neopentyl glycol-1,6-hexanediol reaction product may be mono- or difunctional. Mono-functional monomers are preferred. Those monofunctional monomers found most effective are selected from the class consisting of hydroxyalkyl acrylates and methacrylates, amino alkyl acrylates and methacrylates and phenylalkyl acrylates and methacrylates. The most preferred polymerizable ester monomers are hydroxyethyl methacrylate and hydroxypropyl methacrylate. Additional monofunctional polymerizable ester monomers deemed useful are represented by the following formula:

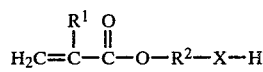   I.

wherein X is —O— or

$R^3$ is hydrogen or lower alkyl of 1 to 7 carbon atoms; $R^1$ is selected from the class of hydrogen, chlorine and methyl and ethyl radicals; and $R^2$ is a divalent organic radical selected from the group consisting of lower alkylene of 1–8 carbon atoms, phenylene and naphthylene.

The suitable hydroxy- or amine-containing materials are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the monoacrylate or monomethacrylate esters of bisphenol-A, the full hydrogenated derivative of bisphenol-A, cyclohexyl diol, and the like.

The reaction may be accomplished in the presence or absence of diluents. Preferably, diluents which include the hydrocarbons such as aliphatic, cycloaliphatic and aromatic hydrocarbons, for example, benzene, toluene, cyclohexane, hexane, heptane, and the like, are employed, but other diluents, such as methyl isobutyl ketone, diamyl ketone, isobutyl methacrylate, and cyclohexyl methacrylate can also be beneficially utilized, if desired, especially where complete compatability with the sealent system is desired.

Other diluents which are useful conform to the formulas:

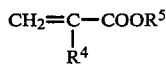

$$CH_2=C-COOR^5 \qquad \text{II.}$$
$$\quad\;\;|$$
$$\quad R^4$$

where $R^4$ is H, $CH_3$, or lower alkyl, $R^5$ is H, alkyl, cycloalkyl alkoxy or alkylene group; or

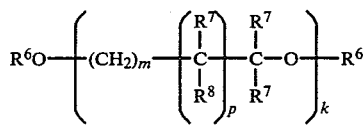

III.

wherein $R^7$ is H, $C_{1-4}$ alkyl or hydroxyalkyl or $R^6OCH_2$—; $R^9$ is H, halogen or $C_{1-4}$ alkyl; $R^8$ is H, OH or $R^6O$—; $R^6$ is $CH_2=CR^9C=O$—; m is an integer, preferably 1 to 8; k is an interger, preferably 1 to 20; and p is 0 or 1; or

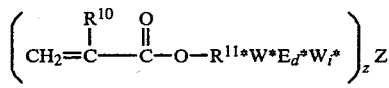

IV.

wherein $R^{10}$ is selected from the class consisting of hydrogen, chlorine, and methyl and ethyl radicals; $R^{11}$ is a bivalent organic radical selected from the group consisting of lower alkylene of 1–8 carbon atoms, phenylene, and naphthylene; W is a polyisocyanate radical; E is an aromatic, heterocyclic or cycloaliphatic polyol or polyamine radical, preferably a diol of a cycloaliphatic compound; d is either 1 or 0; i is 0 when d is 0, and otherwise equal to one less than the number of reactive hydrogen atoms of E; wherein Z is a (i) polymeric or copolymer grafted alkylene ether polyol radical or (ii) polymeric or copolymeric methylene ether polyol radical; z is an integer equal to the valency of Z; wherein an asterisk indicates a urethane (—NH—CO—O—) or ureide (—NH—CO—NH—) linkage; Z may also be a polymeric or copolymer methylene ether polyol radical; or $$(A-X-CO.NH)_nB \qquad \text{V.}$$

wherein X is —O— or —$R^{12}$N—; $R^{12}$ is selected from the group consisting of H or lower alkyls of 1 through 7 carbon atoms; A is $CH_2=CR^{13}.CO.O.$—; $R^{13}$ is H, or $CH_3$; n is an integer from 2 to 6 inclusive; and B is a polyvalent substituted or unsubstituted alkyl, alkenyl, cycloalkyl, aryl, aralkyl, alkyloxy-alkylene, aryloxy-arylene or heterocyclic radical; or $$(CH_2=CR^{14}.CO.O.R^{16}.O.CO.NH)_2R^{15} \qquad \text{VI.}$$

wherein $R^{14}$ is R, $CH_3$, $C_2H_5$ or $C_1$; $R^{15}$ is a $C_{2-20}$ alkylene, alkenylene or cycloalkylene radical or a $C_{6-40}$ arylene, alkarylene, aralkarylene, alkyloxyalkylene or aryloxyarylene radical which may be substituted by 1–4 chlorine atoms or by 1–3 amino or mono- or di-$C_{1-3}$ alkylamino or $C_{1-3}$ alkoxy groups. $R^{16}$ is one of the following less one hydrogen atoms; (a) a $C_{1-8}$ hydroxy alkyl or aminoalkyl group, (b) a $C_{1-6}$ alkylamino-$C_{1-8}$ alkyl group; or (c) a hydroxyphenyl, an aminophenyl, a hydroxynaphthyl or an aminonaphthyl group which may be further substituted by an alkyl, alkylamino or dialkyamino group, each alkyl group in this subpart (c) containing up to about 3 carbon atoms.

The most preferred diluents are selected from the class consisting of acrylate, methacrylate, and glycidyl methacrylate esters of bisphenol-A.

The free-radical catalyst system consists of a free-radical initiator and an accelerator of free radical polymerization, both of which serve to effect rapid polymerization. The free-radical initiators may be of the organic peroxy or hydroperoxy type, perester or peracid type. Especially useful are the perester and peroxide type, among which t-butyl perbenzoate and cumene hydroperoxide are preferred.

Useful free-radical initiators also include those that can be decomposed by the action of heat or UV light to produce free radicals. They also include other redox polymerization catalysts or any compound capable of generating free radicals. Such compounds can easily be selected from those skilled in the art. For a more detailed discussion, see U.S. Pat. Nos. 3,043,820, 3,591,438, 3,616,640, and 3,832,274.

Those free-radical initiators of the photoinitiator type are preferably selected from the group consisting of acetophenones, benzophenones and 1- and 2- acetonaphthones. Additional initiators may be selected from the class consisting of (a) $C_1$ to $C_6$ alkyl diones; (b) metal carbonyls of the formula $M_x(CO)_y$ wherein M is a metal atom, x is 1 or 2, and y is an integer determined by the total valence of the metal atom; and (c) carbonyl compounds of the general formula $R^{17}(CO)R^{18}$ wherein $R^{17}$ is an alkyl aryl, aralkyl or alkaryl group containing up to about 10 carbon atoms, and $R^{18}$ is $R^{17}$ or hydrogen; or $R^{17}$ and $R^{18}$ taken together with carbonyl group form an aromatic or heterocyclic ketone containing up to about 16 carbon atoms.

The initiators are usually employed in amounts of about 1% to about 10% by weight of the composition.

The accelerators of free-radical polymerization of the above-mentioned catalyst system are generally used with good results in concentrations of less than 10% by weight, the preferred range being about 0.1% to about 0.75%. Sulfimides are one preferred group of free-radical accelerators, with the preferred species being 3-oxo-2, 3-dihydrobenz[d]isothiazole-1, 1-dioxide, commonly known as benzoic sulfimide or saccharin. Tertiary amines may also be employed as accelerators for free-radical production with the preferred amine being, N,N-dimethylparatoluidine.

Another preferred accelerator of free-radical polymerization conforms to the formula:

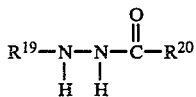

wherein $R^{19}$ is selected from the group consisting of alkyl, cycloalkyl, aryl, alkenyl, cycloalkyl, and $R^{20}$ is selected from the group consisting of hydrogen, alkyl, cycloalkyl, alkenyl, cycloalkenyl, aryl, alkoxy, aryloxy, carbonyl, amino, and the following groups:

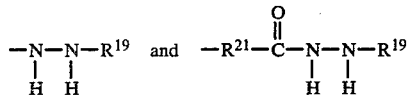

wherein $R^{21}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature. The most preferred accelerator corresponding to the formula above is acetyl-2-phenyl hydrazine. Accelerators of this type are more fully described in a copending application, Ser. No. 05/580,267, filed May 23, 1975, which is hereby incorporated by reference.

It is useful, but not required to incorporate an adhesion promoter into the instant compositions. The adhesion promoters of this invention may be chosen from any of those commonly known to the person reasonably skilled in the art. Two types of promoters are preferred. The first type consists of mono- and dicarboxylic acids which are capable of copolymerizing with the acrylate ester monomer. The preferred species of these classes are methacrylic and acrylic acid. Such acids are used in proportions of 1-20% by weight of the composition, preferably in proportion of 1-15%. The second preferred type of adhesion promoter is of the well-known silane type, present in the composition in proportions of 1-10% by weight of the composition.

It is optional, but recommended, that chelators, cross-linking agents, and inhibitors be present in the adhesive composition for optimum performance. Chelators and inhibitors are effective in amounts of about 0.1 to about 1% by weight of the composition. Ethylenediamine tetra-acetic acid and its sodium salt (Na$_4$EDTA), 2,2-ethylenebis-nitril methylidyne dipyridine and the class of beta-diketones are generally the most effective and are preferred. Cross-linking agents, optionally present in amounts from about zero to about 10% by weight of the composition, include such compounds as copolymerizable dimethacrylates.

The inhibitor concentration left over in the monomers from manufacture is often high enough for good stability. However, to insure maximum shelf life, the proportions mentioned above (about 0.1 to about 1% by weight of the composition) are recommended. Of those inhibitors which have been found of adequate utility is the group consisting of hydroquinones, benzoquinones, naphthoquinones, phenanthraquinones, anthraquinones, and substituted compounds of any of the foregoing. Additionally, various phenols can be employed as inhibitors, the preferred one being 2,6-di-tert-butyl-4-methyl phenol.

The amount of thickness, viscosity, or thixotropy desired can be varied in accordance with the particular application required. Thickeners, plasticizers, diluents, and various other agents common to the art can be employed in any reasonable manner to produce the desired characteristics.

The invention will be appreciated further from the examples to follow, which are not meant in any way to restrict the effective scope of the invention.

EXAMPLES

The following formulation is an embodiment of the instant composition which was used in the example below.

| Composition A | |
|---|---|
| Ingredient | % by weight |
| polyester-urethane-methacrylate resin | 74.7 |
| ethoxylated bisphenol-A-dimethacrylate | 7.84 |
| stabilizer | 0.12 |
| chelator | 1.20 |
| saccharin | 0.60 |
| acetyl-phenyl-hydrazine | 0.45 |
| acrylic acid | 5.19 |
| cumene hydroperoxide | 1.50 |
| ethylene glycol | 0.90 |
| fumed silica | 6.20 |

The above composition was tested for tensile strength against a leading prior art composition. The tests were run on untreated, "as received" aluminum lap shears. A series of lap shears were assembled with the instant composition A, above, and another series were assembled with the prior art composition B, which is a control. The composition B does not contain the polyester diol backbone, but contains a compound formed from the reaction of toluene diisocyanate, and an acrylate ester monomer.

TABLE 1

| | HEAT RESISTANCE | |
|---|---|---|
| | $(d)$Psi | |
| | Composition A | Comp. B (control) |
| $(a)$cure for 15 mins. at room temp. | 100 | 0 |
| $(b)$cure for 24 hours at room temp. | 900 | 350 |
| $(c)$1000 hrs at | | |
| 200° F. | 1680 | 900 |
| 250° F. | 1450 | 650 |
| 300° F. | 1800 | 730 |
| 350° F. | 1020 | 178 |
| 400° F. | 550 | 0 |

$(a)$These lap shear specimens were cured at room temperature for 15 minutes, and then pulled at room temperature in an Instron tensile machine.
$(b)$These specimens were cured for 24 hours at room temperature and then tested in the same manner as (a).
$(c)$All specimens were allowed to fully cure at room temperature and then exposed to the temperatures indicated for 1,000 hours. The specimens were allowed to cool to room temperature prior to testing at room temperature.

The above Table 1 indicates the superior heat resistance the instant composition have over the prior art gasketing materials.

We claim:

1. An adhesive composition, especially useful for gasketing, comprising
   (i) at least one polyester-urethane-methacrylate compound comprising the reaction product of (a) toluene diisocyanate; and
(b) the reaction product of a diol adipate having 3 to 6 carbons, with neopentyl glycol, said reactants (a) and (b) to be reacted in the molor ratio of about 1.7 to 1.9 of (a) to about 1.0 of (b), and
(ii) a free-radical catalyst system.

2. The adhesive composition of claim 1, wherein the free-radical catalyst system comprises a free-radical initiator and an accelerator of free-radical polymerization.

3. The adhesive composition of claim 2, wherein the free-radical initiator is selected from the group consisting of organic peroxides, hydroperoxides, peresters, or peracids.

4. The adhesive composition of claim 3, wherein the perester free-radical initiator is t-butyl perbenzoate.

5. The adhesive composition of claim 3, wherein the free-radical initiator is cumene hydroperoxide.

6. The adhesive composition of claim 3, wherein the free-radical accelerator is a sulfimide or a tertiary amine.

7. The adhesive composition of claim 2, wherein the accelerator of free-radical acceleration is acetyl-phenyl-hydrazine.

8. The adheseive composition of claim 1, wherein there is optionally included a polymerizable acrylate ester monomer conforming to one of the following formulas:

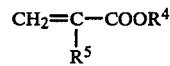

wherein $R^5$ is H, $CH_3$, or lower alkyl, $R^4$ is H, alkyl, cycloalkyl alkoxy or alkylene group; or

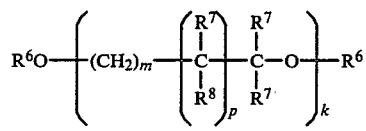

wherein $R^7$ is H, $C_{1-4}$ alkyl or hydroxyalkyl or $R^6OCH_2-$; $R^9$ is H, halogen or $C_{1-4}$ alkyl; $R^8$ is H, OH or $R^6O-$; $R^6$ is $CH_2=CR^9C=O-$; m is an integer, preferably 1 to 8; k is an interger preferably 1 to 20; and p is 0 or 1.

9. The adhesive composition of claim 2, wherein the free-radical initiator is of the photoinitiator-type and is present in concentrations from about 0.1% to about 10% by weight and is selected from the group consisting of acetophenones, benzophenones, and 1- and 2-acetonaphthones.

* * * * *